US012503736B1

(12) United States Patent
Yang et al.

(10) Patent No.: US 12,503,736 B1
(45) Date of Patent: Dec. 23, 2025

(54) THERMAL ENERGY RECOVERY SYSTEMS FOR NON-CONTACT TEMPERATURE DETECTION OF MOLTEN STEEL IN STEELMAKING PROCESS

(71) Applicants: CENTRAL SOUTH UNIVERSITY, Hunan (CN); XI'AN UNIVERSITY OF ARCHITECTURE AND TECHNOLOGY, Shaanxi (CN)

(72) Inventors: Lingzhi Yang, Changsha (CN); Ming Lyu, Xi'an (CN); Hang Hu, Changsha (CN); Yufeng Guo, Changsha (CN); Tao Jiang, Changsha (CN); Guangsheng Wei, Changsha (CN); Feng Chen, Changsha (CN); Shuai Wang, Changsha (CN); Guanzhou Qiu, Hunan (CN)

(73) Assignees: CENTRAL SOUTH UNIVERSITY, Changsha (CN); XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 19/214,025

(22) Filed: May 20, 2025

(30) Foreign Application Priority Data

Sep. 25, 2024 (CN) .......................... 202411343008.8
Oct. 8, 2024 (CN) .......................... 202411395561.6

(51) Int. Cl.
*C21B 13/12* (2006.01)
*F27B 3/22* (2006.01)
(Continued)

(52) U.S. Cl.
CPC ............ *C21B 13/125* (2013.01); *F27B 3/225* (2013.01); *F27D 17/15* (2025.01); *F27D 21/0014* (2013.01); *H10N 10/17* (2023.02)

(58) Field of Classification Search
CPC ........ C21B 13/125; F27B 3/225; F27D 17/15; F27D 21/0014; H10N 10/17
(Continued)

(56) References Cited

U.S. PATENT DOCUMENTS 9,500,528 B2 * 11/2016 Abel .......................... G01J 5/05
10,190,825 B2 * 1/2019 Zhang ................... F27D 3/1509
(Continued)

FOREIGN PATENT DOCUMENTS

CN  201740408 U  2/2011
CN  112902683 A  6/2021
(Continued)

OTHER PUBLICATIONS

Decision to Grant a Patent in Chinese Application No. 202411343008.8 mailed on Nov. 7, 2024, 5 pages.
(Continued)

*Primary Examiner* — Jessee R Roe
*Assistant Examiner* — Michael Aboagye
(74) *Attorney, Agent, or Firm* — PORUS IP LLC (57) ABSTRACT

The present discloses a thermal energy recovery auxiliary system for temperature detection of molten steel in a steelmaking process, comprising an electric arc furnace, a water supply device, a power generation system, a piston type oxygen compression device, and one or more non-contact temperature measurement devices. A flue communicates with a side wall of the electric arc furnace. The water supply device includes a water supply tank, a water supply pipeline of an electrolytic cell, and a thermal energy recovery component. The power generation system includes a Seebeck-effect thermoelectric power generation component and an electrolytic cell. The piston type oxygen compression device forms a steam containment chamber and an oxygen containment chamber through a piston isolation. One end of
(Continued)

each of the one or more non-contact temperature measurement devices communicates with the oxygen containment chamber and the other end of each of the one or more non-contact temperature measurement devices communicates with an interior of the electric arc furnace.

9 Claims, 6 Drawing Sheets

(51) Int. Cl.
*F27D 17/15* (2025.01)
*F27D 21/00* (2006.01)
*H10N 10/17* (2023.01)

(58) Field of Classification Search
USPC .................................. 266/99, 144, 155, 159
See application file for complete search history.

(56) References Cited

U.S. PATENT DOCUMENTS

| | | | |
|---|---|---|---|
| 2010/0319348 A1* | 12/2010 | Jones | F27D 17/304 60/645 |
| 2015/0155464 A1* | 6/2015 | Xu | H10N 10/17 438/54 |
| 2022/0235426 A1* | 7/2022 | Duarte Escareño | C21B 13/026 |

FOREIGN PATENT DOCUMENTS

| | | |
|---|---|---|
| JP | 2011226712 A | 11/2011 |
| KR | 20140131608 A | 11/2014 |

OTHER PUBLICATIONS

Camilla Nicol Bonacina et al., Techno-economic study of chimney-less electric arc furnace plants for the coproduction of steel and of electricity, hydrogen, or methanol, Journal of Cleaner Production, 468: 1-13, 2024.

Tao, Wuchun et al., The Design and Application of Flue Gas Waste Heat Recovery System for 50t Steelmaking Eaf, Industrial Heating, 41(3): 56-60, 2012.

* cited by examiner

THERMAL ENERGY RECOVERY SYSTEMS FOR NON-CONTACT TEMPERATURE DETECTION OF MOLTEN STEEL IN STEELMAKING PROCESS

CROSS-REFERENCE TO RELATED APPLICATIONS

This application claims priority of Chinese Patent Application No. 202411343008.8, filed on Sep. 25, 2024, and Chinese Patent Application No. 202411395561.6, filed on Oct. 8, 2024, the entire contents of which are incorporated herein by reference.

TECHNICAL FIELD

The present disclosure generally relates to the field of metal smelting technology, and in particular, to a thermal energy recovery auxiliary system for temperature detection of molten steel in a steelmaking process.

BACKGROUND

A steelmaking process of an electric arc furnace is accompanied by interactions and heat transfer of multiple types of energies, completing the transformation of the scrap-based metal charge to a high-temperature liquid molten steel with qualified temperature and chemical composition. The smelting process is accompanied by the interaction of multiple types of energies such as an electrical energy input from a motor, a physical heat of the molten iron, and a chemical heat formed by the oxidation of the elements in the molten pool, which promotes the melting phase change and compositional change of the solid charge such as scrap. Most of the energy is absorbed by the molten pool, and the temperature of the molten pool then rises. As smelting proceeds, the molten pool temperature fluctuates and changes. The temperature of the molten pool directly affects the operation and smelting process of oxygen supply, power supply, auxiliary material feeding, and injection in the electric arc furnace, and determines the final temperature and chemical composition of qualified molten steel products.

The conventional temperature measurement process for the molten pool involves on-site operators using an industrial melting temperature gun to measure the temperature from the furnace entrance. The temperature of the entire molten pool is determined by inserting the temperature gun into the measuring point at a depth, which is used to measure the temperature of the molten steel. The detection process relies on manual temperature measurement and has high safety risks due to close contact with high-temperature environments. It is prone to high-temperature thermal damage, and the temperature of the molten steel obtained from the detection can only represent the temperature of a local area in the molten pool, without considering the uneven distribution of the molten pool temperature field. The temperature data obtained cannot represent the temperature of the entire molten steel pool, and there are drawbacks such as large errors.

To solve this problem and avoid the safety issues of manual temperature measurement, a non-contact temperature measurement process is often used to obtain the temperature of the molten steel. The process simultaneously obtains temperatures from multiple measurement points on the high-temperature liquid surface of the molten pool, allowing for real-time feedback of the molten pool liquid surface temperature information. However, during the electric arc furnace smelting process, an upper part of the molten steel surface is covered with slag. Ordinary infrared temperature measuring devices can only obtain the temperature of slag liquid, while the temperature signal of the lower molten steel is blocked. Therefore, the temperature signal obtained by the method still has certain differences from the actual temperature of the molten steel, making it difficult to accurately and real-time obtain the temperature of the molten steel, and unable to provide feedback control and guidance for actual oxygen and power supply operations.

Based on this, the present provides a thermal energy recovery auxiliary system for temperature detection of molten steel in a steelmaking process to obtain the temperature of the molten steel.

SUMMARY

One or more embodiments of the present provide a thermal energy recovery auxiliary system for temperature detection of molten steel in a steelmaking process. The system includes an electric arc furnace, a water supply device, a power generation system, a piston type oxygen compression device, and one or more non-contact temperature measurement devices. A flue communicates with a side wall of the electric arc furnace. The water supply device includes a water supply tank, a water supply pipeline of an electrolytic cell, and a thermal energy recovery component, wherein the water supply pipeline of the electrolytic cell and the thermal energy recovery component communicate with an output port of the water supply tank, respectively, and the thermal energy recovery component exchanges heat with the flue to generate steam. The power generation system includes a Seebeck-effect thermoelectric power generation component and an electrolytic cell, wherein the Seebeck-effect thermoelectric power generation component includes a thermoelectric generator, a voltage stabilizer, a rechargeable battery, and an electrolytic water device, the thermoelectric generator, the voltage stabilizer, and the rechargeable battery form a closed loop, and the rechargeable battery and the electrolytic water device form a closed loop, the electrolytic water device is arranged in the electrolytic cell, and the electrolytic cell communicates with the water supply pipeline of the electrolytic cell, a high-temperature side of the thermoelectric generator exchanges heat with the flue and generates a electromotive force in the electrolytic cell. The piston type oxygen compression device forms a steam containment chamber and an oxygen containment chamber through a piston isolation, wherein the steam containment chamber communicates with the thermal energy recovery component and the oxygen containment chamber communicates with the electrolytic cell. One end of each of the one or more non-contact temperature measurement devices communicates with the oxygen containment chamber and the other end of each of the one or more non-contact temperature measurement devices communicates with an interior of the electric arc furnace.

In some embodiments, the thermal energy recovery component includes a steam generator and a helical heating coil, the steam generator communicates with the water supply tank and the steam containment chamber, respectively, and the helical heating coil is wound around a periphery of the flue and both ends of the helical heating coil communicate with the steam generator.

In some embodiments, the Seebeck-effect thermoelectric power generation component includes a thermoelectric generator, a voltage stabilizer, a rechargeable battery, and an electrolytic water device, the thermoelectric generator, the voltage stabilizer, and the rechargeable battery form a closed loop, and the rechargeable battery and the electrolytic water device form a closed loop, the electrolytic water device is arranged in the electrolytic cell.

In some embodiments, he thermoelectric generator includes a high-temperature side thermal conductive ceramic, a low-temperature side thermal conductive ceramic, an n-type semiconductor, a p-type semiconductor, a high-temperature side metal plate, two low-temperature side metal plates, and an insulation layer, after a same side of the n-type semiconductor and the p-type semiconductor are bonded to one low-temperature side metal plate, respectively, the n-type semiconductor and the p-type semiconductor, as well as the two low-temperature side metal plates, are isolated by the insulation layer, the high-temperature side metal plate is bonded to the other side of the n-type semiconductor and the p-type semiconductor, and the high-temperature side thermal conductive ceramic is bonded to the high-temperature side metal plate, the low-temperature side thermal conductive ceramic is bonded to the two low-temperature side metal plates.

In some embodiments, a heat exchange surface of the high-temperature side thermal conductive ceramic is provided with heat transfer fins.

In some embodiments, the Seebeck-effect thermoelectric power generation component further includes an external supplementary power source, the external supplementary power source is electrically connected with the electrolytic water device.

In some embodiments, the system further includes an electrolytic cell exhaust gas pipeline and an oxygen delivery pipeline that communicate with the electrolytic cell and the piston type oxygen compression device at both ends, a communication port of the electrolytic cell exhaust gas pipeline and the piston type oxygen compression device is located in a middle of a path of the piston, and a communication port of the oxygen delivery pipeline and the piston type oxygen compression device is located outside the path of the piston. When the piston retracts, the high-temperature and high-pressure steam after doing work used as exhaust steam is input from the exhaust steam pipeline of the electrolytic cell into the electrolytic cell. The oxygen delivery pipeline is used to deliver oxygen to the oxygen containment chamber and push the piston to retract.

In some embodiments, the oxygen delivery pipeline includes a gas storage tank and a multi-point balance heat exchanger sequentially communicated along a direction of oxygen delivery, and a path of the electrolytic cell exhaust gas pipeline traverses the multi-point balance heat exchanger.

In some embodiments, the system further includes an oxygen production device, and the oxygen production device communicates with the oxygen delivery pipeline.

In some embodiments, the system further includes an oxygen production device and an oxygen compression device sequentially communicated along a direction of oxygen delivery, wherein the oxygen compression device communicates with an input end of the non-contact temperature measurement device.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

In the figures: 1, an electric arc furnace; 11, a flue; 2, a water supply device; 21, a water supply tank; 22, a water supply pipeline of an electrolytic cell; 23, a thermal energy recovery component; 231, a steam generator; 232, a helical heating coil; 3, a power generation system; 31, a Seebeck-effect thermoelectric power generation component; 311, a thermoelectric generator; 3111, a high-temperature side thermal conductive ceramic; 3112, a low-temperature side thermal conductive ceramic; 3113, a n-type semiconductor; 3114, p-type semiconductor; 3115, a high-temperature side metal plate; 3116, a low-temperature side metal plate; 3117, a insulation layer; 3118, a heat transfer fins; 312, a voltage stabilizer; 313, a rechargeable battery; 314, an electrolytic water device; 315, an external supplementary power source; 32, an electrolytic cell; 4, a piston type oxygen compression device; 41, a piston; 42, a steam containment chamber; 43, an oxygen containment chamber; 5, an non-contact temperature measurement devices; 51, a main oxygen jet pipe; 511, a pipe inlet; 512, a pipe indentation; 513, a pipe outlet; 52, an epoxy jet pipe; 53, a temperature measurement inner pipe; 531, a temperature measurement probe; 532, a probe inner pipe cooling chamber; 533, a cooling water inlet pipe; 534, a cooling water outlet pipe; 54, a annular 61, an electrolytic cell exhaust gas pipeline; 62, an oxygen delivery pipeline; 621, a gas storage tank; 622, a multi-point balance heat exchanger; 63, oxygen production device; 64, oxygen compression device; 7, a piston type hydrogen compression device; 71, a second piston; 72, a second steam containment chamber; 73, a hydrogen containment chamber.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with the accompanying drawings, without creative labor. The specification can be applied to other similar scenarios based on these drawings without creative labor for those of ordinary skill in the art. Based on the embodiments provided in this specification, all other embodiments obtained by a person of ordinary skill in the art without creative labor fall within the scope of protection of this specification. Unless obviously obtained from the context or the context illustrates otherwise, the same numeral in the drawings refers to the same structure or operation.

Figure 1:
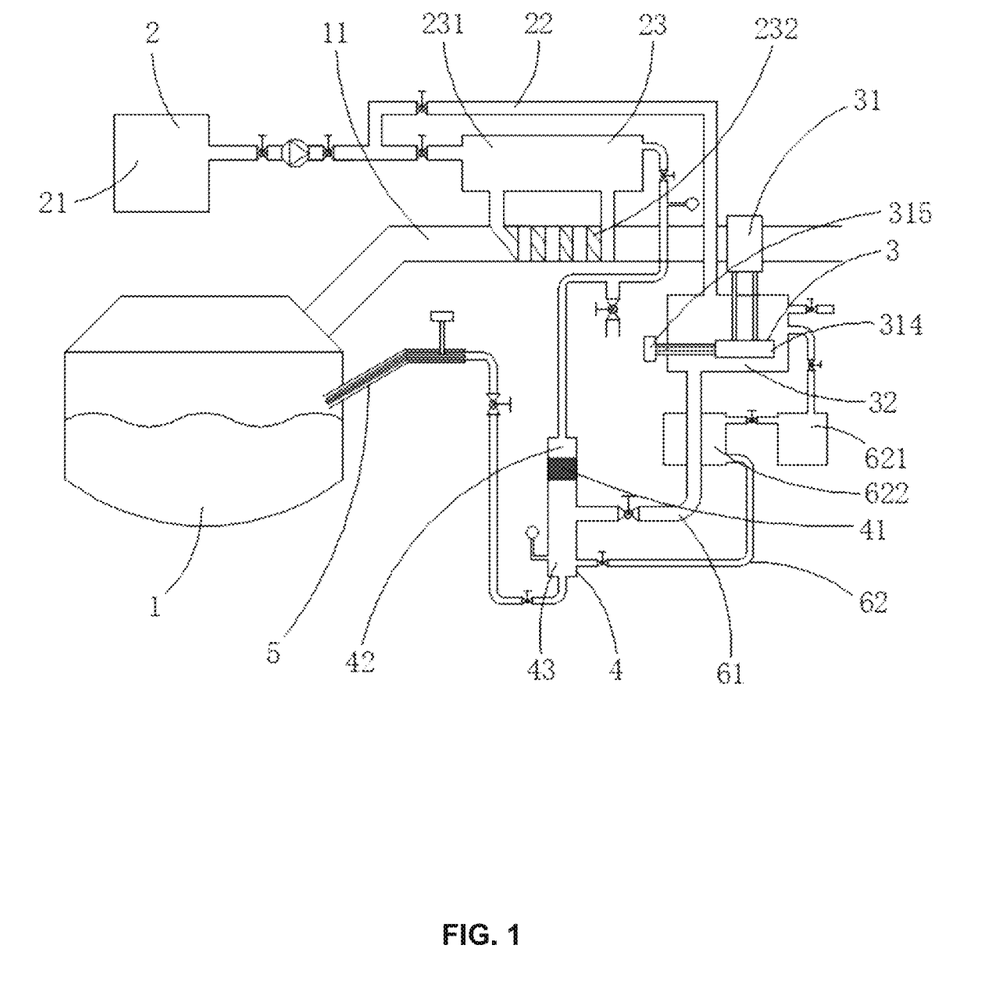
FIG. 1 is a schematic diagram illustrating a structure of a thermal energy recovery auxiliary system for temperature detection of molten steel in a steelmaking process according to some embodiments of the present disclosure.

FIG. 1 is a schematic diagram illustrating a structure of a thermal energy recovery auxiliary system for temperature detection of molten steel in a steelmaking process according to some embodiments of the present disclosure.

In some embodiments, as shown in FIG. 1, a thermal energy recovery auxiliary system for temperature detection of molten steel in a steelmaking process (referred to as the thermal energy recovery auxiliary system) includes an electric arc furnace 1, a water supply device 2, a power generation system 3, a piston type oxygen compression device 4, and one or more non-contact temperature measurement devices 5.

The electric arc furnace 1 refers to a metallurgical device that utilizes electrical energy to melt scrap or direct reduced iron (DRI) through a high-temperature electric arc generated between a graphite electrode and a metallic material. The electric arc furnace 1 includes a furnace body, an electrode system, a power supply system, and an auxiliary device. A flue 11 communicates with a side wall of the electric arc furnace 1. The flue 11 refers to a flue system for collecting, cooling, and treating the high-temperature flue gases, dust, and hazardous gases generated in the smelting process.

The water supply device 2 refers to an apparatus for providing electrolyzed water and cooling water. The water supply device 2 includes a water supply tank 21, a water supply pipeline of an electrolytic cell 22, and a thermal energy recovery component 23. The water supply tank 21 refers to a device used for storing, stabilizing, and regulating the volume of water, which is used to ensure a stable supply of cooling water, process water, or the like. The water supply tank 21 includes a water tank set and a pressure stabilizing pump set. The water supply pipeline of the electrolytic cell 22 refers to a pipe that provides water from the water supply tank 21 to the electrolytic cell. The thermal energy recovery component 23 refers to a device for capturing the waste heat generated by the high temperature flue gases, such as heat exchangers, waste heat boilers, or the like. The water supply pipeline of the electrolytic cell 22 and the thermal energy recovery component 23 communicate with an output port of the water supply tank 21. The thermal energy recovery component 23 exchanges heat with the flue 11 to generate steam.

Figure 2:
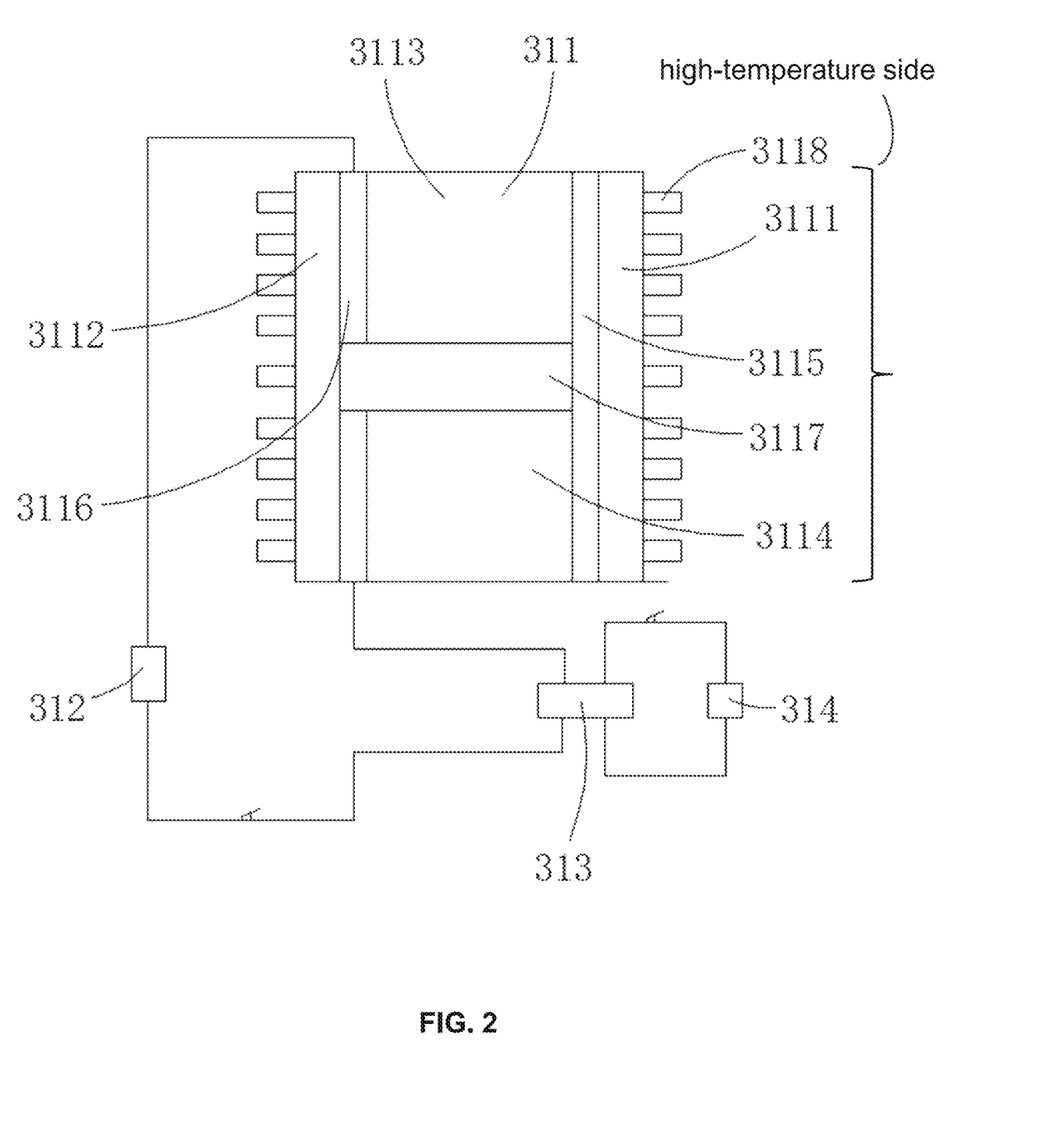
FIG. 2 is a schematic diagram of the structure illustrating a Seebeck-effect thermoelectric power generation component according to some embodiments of the present disclosure.

The power generation system 3 refers to a system for generating electricity and electrolyzing water. The power generation system 3 includes a Seebeck-effect thermoelectric power generation component 31 and an electrolytic cell 32. The Seebeck-effect thermoelectric power generation component 31 refers to a solid-state device that directly converts thermal energy into electrical energy. The electrolytic cell refers to a container for holding the electrolytic water device and water. As shown in FIG. 2, the Seebeck-effect thermoelectric power generation component 31 includes a thermoelectric generator 311, a voltage stabilizer 312, a rechargeable battery 313, and an electrolytic water device 314. The thermoelectric generator 311, the voltage stabilizer 312, and the rechargeable battery 313 form a closed loop, and the rechargeable battery 313 and the electrolytic water device 314 form a closed loop. The electrolytic water device 314 is arranged in the electrolytic cell 32, and the electrolytic cell 22 communicates with the water supply pipeline of the electrolytic cell, a high-temperature side of the thermoelectric generator 311 exchanges heat with the flue 111 and generates an electromotive force in the electrolytic cell 32. More descriptions of the Seebeck-effect thermoelectric power generation component 31 may be found in FIG. 2 and related descriptions. The present disclosure uses the thermoelectric generator 311 to recover heat energy from the high temperature flue gas in the flue 11, and realizes the conversion of heat energy and electric energy through the temperature difference Seebeck effect, which effectively utilizes the residual heat generated by the electric arc furnace 1 for generating electricity, and applying this part of electricity to oxygen production. The oxygen produced is then used to form a blowing gas stream to assist in temperature measurement, or is used in the oxygen supply process for the molten pool to form a closed loop of the process.

The piston type oxygen compression device 4 (also referred to as the piston oxygen compression device 4) refers to a device that compresses oxygen by means of a piston when a pressurized gas is used and is supplied with oxygen when a pressurized gas is not used. The piston type oxygen compression device 4, which forms a steam containment chamber 42 (also referred to as a first steam containment chamber 42) and an oxygen containment chamber 43 through isolation using the piston 41 (also referred to as a first piston 41). The steam containment chamber 42 communicates with the thermal energy recovery component 23. The oxygen containment chamber 43 communicates with the electrolytic cell 32.

The non-contact temperature measurement device 5 refers to a device that measures the temperature of the molten steel using a non-contact process. The non-contact temperature measurement device 5 includes an infrared temperature measurement device. The infrared temperature measurement device calculates a temperature of a surface of an object by detecting the infrared energy radiated by the object. The infrared temperature measurement device includes a single-point infrared thermometer, a thermal imaging camera, a fiber optic infrared thermometer, and a two-color (colorimetric) thermometer, or the like. One end of each of the one or more non-contact temperature measurement devices communicates with the oxygen containment chamber 43 and the other end of each of the one or more non-contact temperature measurement devices 5 communicates with an interior of the electric arc furnace 1. The non-contact temperature measurement devices 5 are arranged in a multipoint arrangement inside the electric arc furnace 1 and close to a liquid level of the molten pool. The interior of the non-contact temperature measurement devices 5 is internally provided with an oxygen jet pipeline for oxygen circulation and a temperature measuring inner tube for measuring the temperature of the molten steel, and the oxygen jet pipeline communicates with the oxygen containment chamber 43. The temperature measurement inner tube is located inside the flow channel of the oxygen jet pipeline. The temperature measurement inner tube includes a housing for protection and a temperature measurement probe disposed inside the housing. The temperature measurement probe measures the temperature of the molten pool in the direction of oxygen delivery of the oxygen injection pipeline, and when the oxygen flows through the inner tube of the temperature measurement, the temperature of the oxygen is relatively low compared to the temperature of the high temperature flue gas in the electric arc furnace 1, which effectively protects the temperature measurement probe from the high temperature.

In a process where the non-contact temperature measurement device 5 does not perform temperature measurement (e.g., the charge melting and melt pool reaction process in the pre-smelting stage of the electric arc furnace 1, where melt pool temperature measurement is not required), the non-contact temperature measurement device 5 is used as a conventional oxygen supplying oxygen jet to provide a high velocity oxygen jet. This time, the main role of the non-contact temperature measurement device 5 is to supply oxygen to the molten pool to accelerate the melting of the charge, the molten pool of the chemical reaction of exothermic and melting process.

The molten pool of the electric arc furnace 1 generates high-temperature flue gases that are discharged from the flue 11 during the smelting process. The high-temperature flue gas exchanges heat with the water supply device 2 and the power generation system 3, respectively, in the process of circulating in the flue 11. The water supply tank 21 supplies water to the water supply pipeline of the electrolytic cell 22 and the thermal energy recovery component 23, respectively, and the water supply pipeline of the electrolytic cell 22 conveys the water to the electrolytic cell 32 for electrolysis to produce oxygen. The thermal energy recovery component 23 exchanges heat with the flue 11 to heat up the interior water and generate high-temperature steam, which is transported to the steam containment chamber 42 to do work on the piston 41. The Seebeck-effect thermoelectric power generation component 31 utilizes the high temperature of the flue 11 to form a temperature difference, generates power according to the Seebeck effect, and generates oxygen by electrolysis of water in the electrolytic cell 32, and the oxygen is transported from the electrolytic cell 32 to the oxygen containment chamber 43 for storage. The piston 41 moves in the direction of the oxygen containment chamber 43 and compresses the oxygen as the steam continues to do work on the piston 41. When the oxygen is compressed to the rated pressure, the valve is opened to release the oxygen and the oxygen enters into one or more non-contact temperature measurement devices 5. The oxygen is directed to the liquid surface of the molten pool through one or more non-contact temperature measurement devices 5 to form an oxygen jet, which blows away the slag on the surface of the molten pool to expose the molten steel, and accurately measures the temperature of the molten steel through non-contact temperature measurement devices 5.

The thermal energy recovery component 23 includes a steam generator 231 and a helical heating coil 232. The helical heating coil 232 is provided within the steam generator 231. The steam generator 231 refers to a device that converts water into steam using waste heat from high temperature flue gas. The steam generator 231 includes a waste heat boiler, a vaporization cooling system, or the like. The helical heating coil 232 refers to a heat exchange device having a spiral structure. The steam generator 231 communicates with the water supply tank 21 and the steam containment chamber 42, respectively, and the helical heating coil 232 is wound around a periphery of the flue 11 and both ends of the helical heating coil 232 communicate with the steam generator 231. Steelmaking in the electric arc furnace is a high-temperature multi-phase complex process, and the smelting process of supplying oxygen for power supply, carbon powder, and natural gas blowing and other operations produce a large amount of fumes in the process of intensifying energy input to the molten pool, and melting the metal charge. The high temperature flue gas of 1000° C. to 1450° C. generated in the electric arc furnace 1 enters into the flue 11, and exchanges heat with the helical heating coil 232 when it passes through the helical heating coil 232 attached to the periphery of the flue 11, and which is used to heat the water circulating in the helical heating coil 232. At this time, the water supply pipeline pump of the water supply tank 21, the valves before and after the water supply pipeline pump, a valve of the water supply pipeline of the steam generator 231, and a valve of the water supply pipeline of the electrolytic cell 32 are opened, and the water from the water supply tank 21 enters the steam generator 231 and the electrolytic cell 32, respectively. After maintaining the appropriate water levels in the steam generator 231 and the electrolytic cell 32, the opening of valves of the water supply pipeline of the steam generator 231 and the electrolytic cell 32 is reduced to ensure that the supplied water is equal to the water consumed by the steam generator 231 and the electrolytic cell 32, respectively. The water inside the steam generator 231 is continuously heated and evaporated inside the helical heating coil 232, always ensuring that the steam generator 231 continuously produces high-temperature and high-pressure water vapor.

It should be noted here that the shape of the helical heating coil 232 is in the form of the spiral coil to improve the efficiency of heat exchange, but the present disclosure does not limit the specific shape of the helical heating coil 232, and any changes made to the shape of the helical heating coil 232 on this basis shall be within the scope of protection of the present disclosure.

The thermal energy recovery auxiliary system also includes an electrolytic cell exhaust gas pipeline 61 and an oxygen delivery pipeline 62 that communicate with the electrolytic cell 32 and the piston type oxygen compression device 4 at both ends. The electrolytic cell exhaust gas pipeline 61 refers to a pipeline for entering the electrolytic cell 32 as spent vapor from the upthrust process of the piston 41. The oxygen delivery pipeline 62 refers to a pipeline for delivering oxygen generated in the electrolytic cell to the piston type oxygen compression device 4. The oxygen delivery pipeline 62 is used to communicate the electrolytic cell 32 with the oxygen containment chamber 43. The oxygen delivery pipeline 62 exchanges heat with the electrolytic cell exhaust gas pipeline 61. A communication port of the electrolytic cell exhaust gas pipeline 61 and the piston type oxygen compression device 4 is located in a middle of a path of the piston 41. A communication port of the oxygen delivery pipeline 62 and the piston type oxygen compression device 4 is located outside the path of the piston 41. A large amount of high-temperature and high-pressure water vapor is generated in the steam generator 231, and by opening the valve of the gas supply main line of the steam generator 231, the high-temperature and high-pressure water vapor enters into the interior of the steam containment chamber 42, squeezing and pushing the piston 41 to move and compress the interior oxygen. At this time, the valve of the electrolytic cell exhaust gas pipeline 61 and the valve of the oxygen delivery pipeline 62 are closed. When a pressure gauge of the oxygen containment chamber 43 observes that the oxygen pressure reaches a set requirement (e.g., exceeds a threshold value), the piston 41 also moves to a position somewhere between the port of the electrolytic cell exhaust gas pipeline 61 (i.e., the communication port of the electrolytic cell exhaust gas pipeline 61 to the piston type oxygen compression device 4) and the port of the oxygen delivery pipeline 62 (i.e., the communication port of the oxygen delivery pipeline 62 to the piston type oxygen compression device 4). At this time, the valve of the pipeline at the outlet end of the oxygen containment chamber 43 is opened, and the high-pressure oxygen arrives through the pipeline to be used as a blowing airflow in the non-contact temperature measurement device 5.

After a rated amount of high-pressure oxygen is discharged from the oxygen containment chamber 43, a pipeline valve of the electrolytic cell exhaust gas pipeline 61 and a pipeline valve of the oxygen delivery pipeline 62 are opened, the pipeline valve at the outlet end of the oxygen containment chamber 43 is closed, and the oxygen is replenished to the oxygen containment chamber 43 by the oxygen delivery pipeline 62 and does work on the piston 41 to move the piston 41 in the direction of the steam containment chamber 42. The steam enters the electrolytic cell 32 from the electrolytic cell exhaust gas pipeline 61 as spent vapor during the movement of the piston 41 until the piston 41 is pushed to the original position, at which time the pipe valves of the electrolytic cell exhaust gas pipeline 61 and the valve of the oxygen delivery pipeline 62 are closed to prepare for the next round of oxygen compression.

A steam supply main line pressure gauge and a steam emergency relief valve of the steam generator 231 are provided on the pipeline between the steam generator 231 and the steam containment chamber 42. The pressure gauge is used to monitor the air pressure in the steam supply main line, and when the air pressure exceeds a rated air pressure value, the steam emergency pressure relief valve opens to relieve the pressure, preventing the pressure from exceeding the critical value and resulting in an explosion and other safety risks.

The oxygen delivery pipeline 62 includes a gas storage tank 621 and a multi-point balance heat exchanger 622 sequentially communicated along a direction of oxygen delivery. The gas storage tank 621 refers to a tank for storing oxygen. The multi-point balance heat exchanger 622 refers to a device used for waste heat recovery from complex heat sources (multiple temperatures, multiple media). A path of the electrolytic cell exhaust gas pipeline 61 traverses the multi-point balance heat exchanger 622. The valve of the oxygen output pipeline of the electrolytic cell 32 is opened, and the oxygen produced by the pole plate on the water side of the electrolysis enters into the gas storage tank 621 through the oxygen output pipeline of the electrolytic cell 32. When the non-contact temperature measurement device 5 does not need to purge the airflow, the valve of the pipeline at the outlet end of the gas storage tank 621 is closed, and the oxygen is gradually stored in the gas storage tank 621 for subsequent use. When the non-contact temperature measurement device 5 needs to blow the airflow, a valve of the outlet end pipeline of the gas storage tank 621 is opened, and the oxygen enters the multi-point balance heat exchanger 622. In the multi-point balance heat exchanger 622, the heat is exchanged with the high-temperature exhaust steam in the electrolytic cell exhaust gas pipeline 61 to increase the temperature of oxygen. On the one hand, it makes the compressed oxygen in the oxygen containment chamber 43 reach the set pressure value in advance, and on the other hand, it improves the penetration of the oxygen jet core section.

Considering the discontinuity and temperature volatility of the high-temperature flue gas produced by the electric arc furnace 1 in the steelmaking process, the electric power obtained by the Seebeck-effect thermoelectric power generation component 31 during a part of the smelting process is insufficient, resulting in the production of the oxygen produced by its electrolyzed water is difficult to meet the demand of the blowing airflow of the non-contact temperature measurement device 5; therefore, the present disclosure sets up an electric-oxygen synergistic compensation system. For example, the Seebeck-effect thermoelectric power generation component 31 further includes an external supplementary power source 315, the external supplementary power source 315 is electrically connected with the electrolytic water device 314. The external supplementary power source 315 forms an electrical energy supplement unit through the power supply line. The electrical energy input from the external power grid is used as supplementary electrical energy, which is combined with the electrical energy provided by the Seebeck-effect thermoelectric power generation component 31 to supply the electrolytic water device 314 to produce oxygen, ensuring that the electrolytic water device 314 meets the blowing airflow requirements of the non-contact temperature measurement device 5. Other embodiments of the electric-oxygen synergistic compensation system may be found in FIG. 3 and FIG. 4.

FIG. 2 is a schematic diagram illustrating a structure of a Seebeck-effect thermoelectric power generation component according to some embodiments of the present disclosure.

In some embodiments, as shown in FIG. 2, the Seebeck-effect thermoelectric power generation component 31 includes a thermoelectric generator 311, a voltage stabilizer 312, a rechargeable battery 313, and an electrolytic water device 314. The thermoelectric generator 311 refers to a solid-state energy conversion device based on the Seebeck effect that directly converts thermal energy into electrical energy without the need for mechanical moving parts. The voltage stabilizer 312 refers to an electronic device that automatically adjusts the output voltage to keep the output voltage within a set range. The rechargeable battery 313 refers to an energy storage device that converts chemical energy into electrical energy and can be charged and discharged cyclically. The electrolytic water device 314 refers to an electrochemical device that utilizes electrical energy to break down water into hydrogen and oxygen. The thermoelectric generator 311, the voltage stabilizer 312, and the rechargeable battery 313 form a closed loop, and the rechargeable battery 313 and the electrolytic water device 314 form a closed loop. The electrolytic water device 314 is provided in the electrolytic cell 32. The temperature of the high-temperature flue gas in the flue 11 falls after most heat energy is absorbed by the helical heating coil 232, but the temperature is still much higher than the room temperature, and it has a great value of heat energy recovery and utilization.

When the high-temperature flue gas flows through the thermoelectric generator 311, a temperature difference electromotive force is formed by the thermoelectric generator 311 under the Seebeck effect, and a temperature difference current is formed to be stored in the rechargeable battery 313 under the stabilization effect of the voltage stabilizer 312. When oxygen production is required, the rechargeable battery 313 provides current to the electrolytic water device 314, the electrolytic water device 314 electrolyzes water and produces oxygen under the level of the electrolytic cell 32. In this link, the waste heat of the high-temperature flue gas is deeply utilized by the thermoelectric Seebeck effect thermoelectric generator 311, and the heat energy is converted into electrical energy and stored.

In some embodiments, the thermoelectric generator 311 includes a high-temperature side thermal conductive ceramic 3111, a low-temperature side thermal conductive ceramic 3112, an n-type semiconductor 3113, a p-type semiconductor 3114, a high-temperature side metal plate 3115, two low-temperature side metal plates 3116, and an insulation layer 3117. The thermal conductive ceramics refer to ceramic materials having high thermal conductivity, electrical insulation, high temperature resistance, and chemical stability. A same side of the n-type semiconductor 3113 and the p-type semiconductor 3114 are bonded to one low-temperature side metal plate 3116. The n-type semiconductor 3113 and the p-type semiconductor 3114 are isolated by the insulation layer 3117. Two low-temperature side metal plates 3116 are isolated by the insulation layer 3117. The high-temperature side metal plate 3115 is bonded to the other side of the n-type semiconductor and the p-type semiconductor. The high-temperature side thermal conductive ceramic 3111 is bonded to the high-temperature side metal plate 3115. The low-temperature side thermal conductive ceramic 3112 is bonded to said two low-temperature side metal plates 3116. When the high-temperature flue gas flows through the thermoelectric generator 311, the flue gas continuously heats the high-temperature side thermal conductive ceramic 3111. In some embodiments, a heat exchange surface of the high-temperature side thermal conductive ceramic is provided with heat transfer fins 3118. The heat transfer fins 3118 strengthen the heat transfer effect, causing the temperature of the high-temperature side thermal conductive ceramic 3111 on the high-temperature side to increase rapidly. The elevated temperature of the high-temperature side of the high-temperature side thermal conductive ceramic 3111 further transfers heat to the high-temperature side metal plate 3115 and then to the hot end of the n-type semiconductors 3113 and the p-type semiconductors 3114 that are in close contact with the high-temperature side metal plate 3115, resulting in an increase in the temperature of the hot ends of the two semiconductors. The low-temperature side thermal conductive ceramic 3112 is in direct contact with the external environment, and its temperature is approximately equal to the low-temperature external environment temperature it is in contact with. Therefore, the temperature of the cold end of the low-temperature side metal plate 3116, the n-type semiconductor 3113, and the p-type semiconductor 3114 in contact with the low-temperature side thermal conductive ceramics 3112, is similarly approximately equal to the low-temperature outside ambient temperature. As a result, a large temperature difference is formed between the n-type semiconductor 3113 and the p-type semiconductor 3114 on both sides.

According to the Seebeck effect, a temperature difference electromotive force (TDE) is formed between the cold end and the hot end of the n-type semiconductor 3113 and the p-type semiconductor 3114, and the direction of the temperature difference electromotive force of the n-type semiconductor 3113 points from the high temperature end to the low temperature end, and the direction of the temperature difference electromotive force of the p-type semiconductor 3114 is from the low temperature end to the high temperature end, ultimately forming a temperature difference Seebeck effect power generation closed loop.

Figure 3:
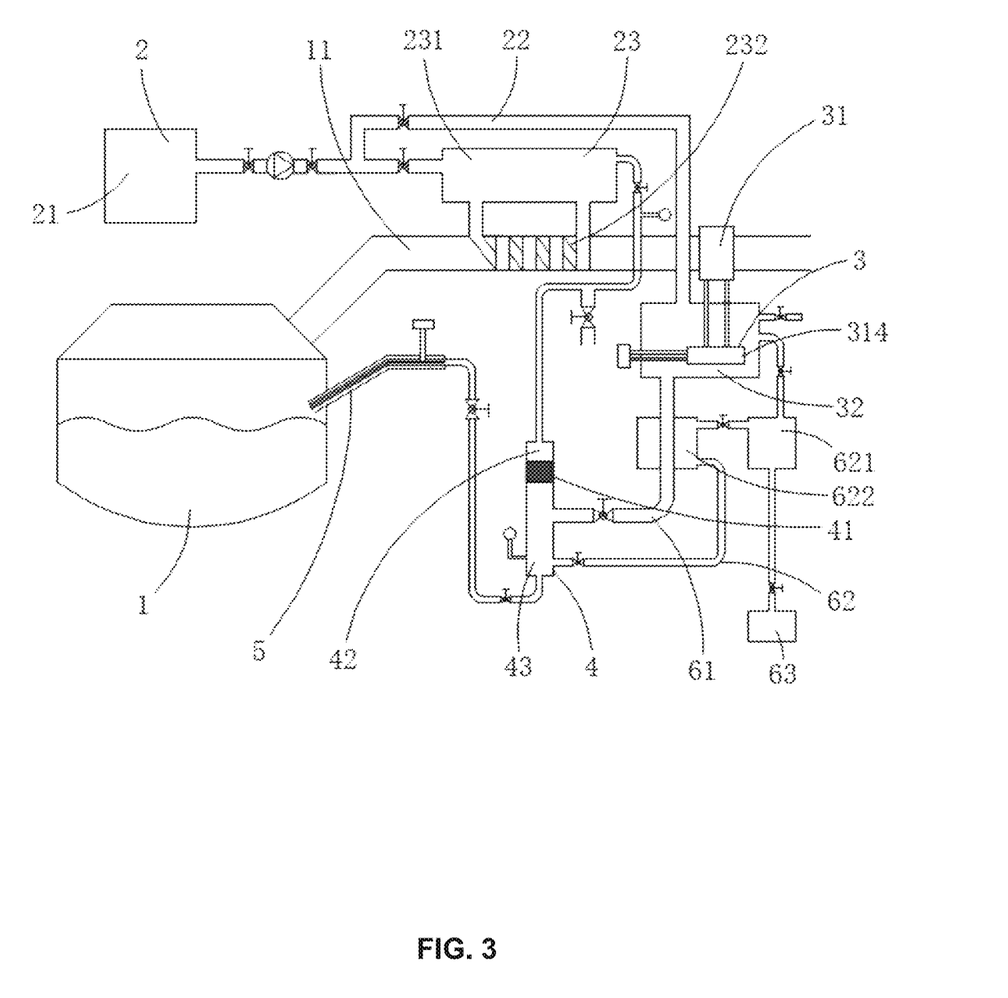
FIG. 3 is a schematic diagram illustrating a structure of an electro-oxygen synergistic compensation system according to some embodiments of the present disclosure.

FIG. 3 is a schematic diagram illustrating a structure of an electro-oxygen synergistic compensation system according to some embodiments of the present disclosure.

In some embodiments, the thermal energy recovery auxiliary system further includes an oxygen production device 63 as shown in FIG. 3. The oxygen production device 63 refers to a device for separating and purifying oxygen from air or other oxygen-containing substances by physical or chemical means. The oxygen production device 63 prepares oxygen by deep cooling manner, variable pressure adsorption manner, membrane separation manner, or the like. The oxygen production device 63 communicates with the oxygen delivery pipeline 62. Considering that there is an oxygen supply operation in the steelmaking process of the electric arc furnace 1, there is an existing oxygen resource on site, and the insufficiency of the purge airflow is supplemented by dividing a portion of the oxygen resource within the oxygen production device 63 to be supplied for use by the purge airflow. The process of compensation focuses on supplementing the consumption of oxygen in the blowing airflow by supplying uncompressed oxygen from the oxygen production device 63 directly to the gas storage tank 621 for compression by the subsequent piston type oxygen compression device 4 as well as the blowing airflow of the non-contact temperature measurement device 5.

Figure 4:
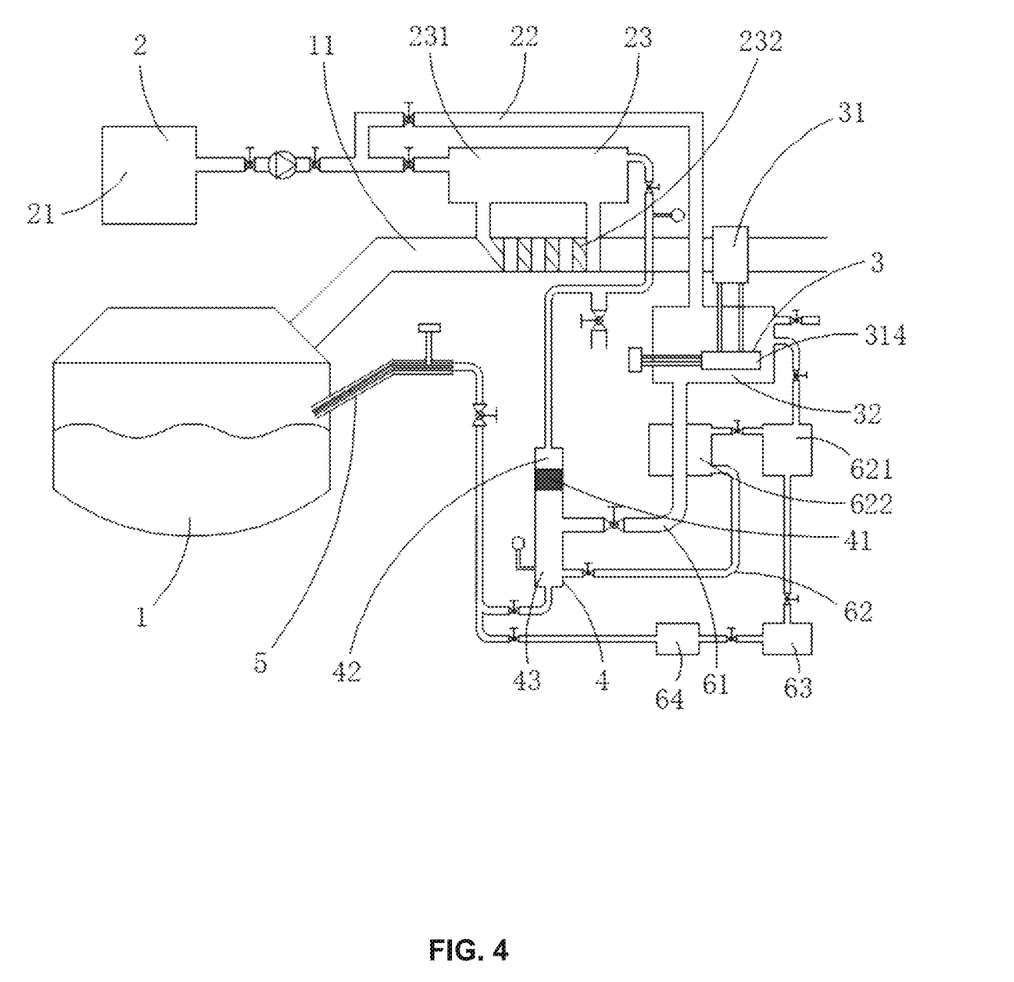
FIG. 4 is a schematic diagram illustrating a structure of another electro-oxygen synergistic compensation system according to some embodiments of the present disclosure.

FIG. 4 is a schematic diagram illustrating a structure of another electro-oxygen synergistic compensation system according to some embodiments of the present disclosure.

In some embodiments, the thermal energy recovery auxiliary system further includes an oxygen production device 63 sequentially communicated along the direction of oxygen delivery, and an oxygen compression device 64, as shown in FIG. 4. The oxygen compression device 64 refers to a device that pressurizes low pressure oxygen to a target pressure. The oxygen compression device 64 communicates with an input end of the non-contact temperature measurement device 5. The oxygen compression device 64 differs from the piston type oxygen compression device 4 in that a core of the oxygen compression device 64 is a gas compression pump, which is used in a compression structure such as screw type, scroll type or reciprocating piston type, and is driven by an external power supply.

The compressed oxygen is supplied directly to the non-contact temperature measurement device 5 after active compression of the oxygen delivered by the oxygen production device 63 by means of a gas compression pump. That is, instead of adopting the option of the oxygen production device 63 supplying uncompressed oxygen to the gas storage tank 621, the oxygen production device 63 supplies uncompressed oxygen to the oxygen compression device 64, then the oxygen compression device 64 compresses the oxygen to the same or similar pressure conditions as the oxygen in the piston type oxygen compression device 4, and after compressing it to a rated pressure, the compressed oxygen can be provided directly to the non-contact temperature measurement device 5 through the output pipe of the oxygen compression device 64. This compensation process takes into account the fact that the power generation is relatively low when the temperature of the high temperature flue gas is low, and in addition to the insufficient amount of oxygen supplied to the oxygen containment chamber 43, the amount of gas supplied to the steam containment chamber 42 is also low, resulting in the insufficient pressure of the oxygen jet supplied to the non-contact temperature measurement device 5. Therefore, the non-contact temperature measurement device 5 is actively supplied with pressurized air through the oxygen compression device 64 to form an oxygen supply supplement to the piston type oxygen compression device 4.

Figure 5:
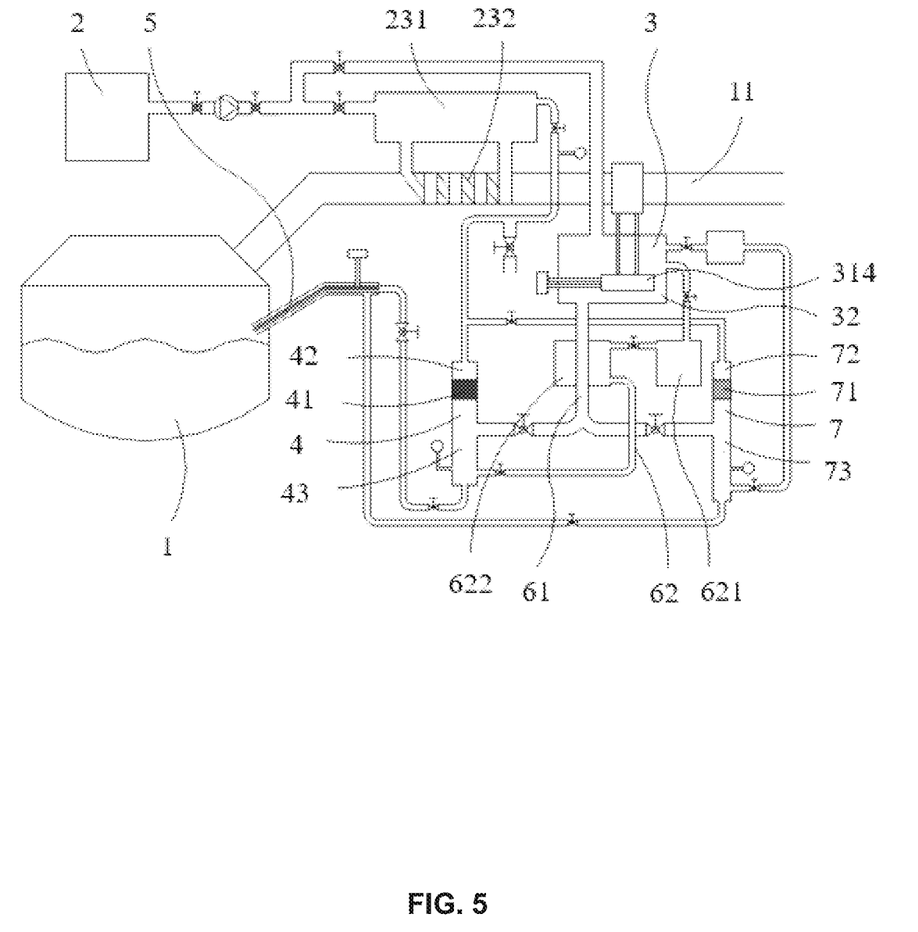
FIG. 5 is a schematic diagram illustrating an overall structure of another thermal energy recovery auxiliary system for temperature detection of molten steel in a steelmaking process according to some embodiments of the present disclosure.

FIG. 5 is a schematic diagram illustrating a structure of another thermal energy recovery auxiliary system for temperature detection of molten steel in a steelmaking process according to some embodiments of the present disclosure.

In some embodiments, the thermal energy recovery auxiliary system further includes a piston type hydrogen compression device 7 as shown in FIG. 5. The piston type hydrogen compression device 7 refers to a device that compresses hydrogen by means of a piston when a pressurized gas is used and supplied with hydrogen when a pressurized gas is not used. The piston type hydrogen compression device 7 is isolated by a second piston 51 to form a second steam containment chamber 72 and a hydrogen containment chamber 73. The second steam containment chamber 72 is in communication with the steam generator 231. The hydrogen containment chamber 73 is in communication with the negative extremity of the electrolytic water device 314. One end of each of one or more non-contact temperature measurement devices 5 communicates with the oxygen containment chamber 43 and the hydrogen containment chamber 73, respectively. The other end of each of the one or more non-contact temperature measurement devices 5 is in communication with the interior of the electric arc furnace 1. The oxygen containment chamber 43 is in communication with the positive end of the electrolytic water device 314. One end of the electrolytic cell exhaust gas pipeline 61 communicates with the electrolytic cell 32, and the other end of the electrolytic cell exhaust gas pipeline 61 communicates with the first steam containment chamber 42 of the piston oxygen compression unit 4 and the second steam containment chamber 72 of the piston hydrogen compression unit 7, respectively.

The steam generator 231 generates steam and delivers the steam to the first steam containment chamber 42 and the second steam containment chamber 72, respectively, to do work on the first piston 41 and the second piston 71 and to push the first piston 41 and the second piston 71 to compress the gas in the oxygen containment chamber 43 and the hydrogen containment chamber 73. The electrolytic water device 314 electrolyzes water in the electrolytic cell 32 to generate oxygen and hydrogen. The oxygen is generated at a positive end of the electrolytic water device 314 and then piped to the oxygen containment chamber 43, while hydrogen is generated at the negative end and then piped to the hydrogen containment chamber 73. The oxygen in the oxygen containment chamber 43 is compressed under the impetus of the first piston 41, and the release of high-pressure oxygen into the non-contact temperature measurement device 5 forms a high-pressure oxygen jet that jets into the melting pool in the electric arc furnace 1 to blow away the surface slag of the melting pool, improving the temperature measurement accuracy of the non-contact temperature measurement device 5. The hydrogen gas in the hydrogen containment chamber 73 is compressed by the second piston 71 for storage. When the slag layer is thicker in the steelmaking process of the electric arc furnace 1, and it is difficult to blow away the slag layer using the conventional oxygen jet or the effect of blowing the slag is not obvious, the valve of the output port of the hydrogen containment chamber 73 opens, and after release, high-pressure hydrogen enters the non-contact temperature measurement device 5 to supplement the oxygen jet.

In some embodiments, a large amount of high-temperature and high-pressure water vapor is generated in the steam generator 231, the inlet duct valve of the first steam containment chamber 42 is opened, the inlet duct valve of the second steam containment chamber 72 is closed, and the high-temperature and high-pressure water vapor enters the first steam containment chamber 42 to squeeze and push the first piston 41 to move and compress the oxygen in the oxygen containment chamber 43. When the oxygen pressure reaches a set value as observed by the pressure gauge in the oxygen containment chamber 43, a valve of the inlet pipe of the first steam containment chamber 42 closes, and the movement of the first piston 41 stops. At this time, a valve of the outlet pipeline of the oxygen containment chamber 43 is opened, and the high-pressure oxygen enters the non-contact temperature measurement device 5 as a blowing airflow to blow away the slag layer, exposing the molten steel to improve the temperature measurement accuracy of the non-contact temperature measurement device 5. This process is used in the early and late stages of smelting in the electric arc furnace 1, where the slag layer thickness is small, to improve the temperature measurement accuracy. After the oxygen in the oxygen containment chamber 43 is discharged, a valve of the air outlet pipe of the oxygen containment chamber 43 is closed, a valve of the air inlet pipe of the oxygen containment chamber 43 is opened, and the electrolytic water device 314 electrolyzes oxygen to supply oxygen to the oxygen containment chamber 43 for oxygen supply, and the oxygen pushes the first piston 41 back to the original position, preparing for the next round of oxygen compression.

In some embodiments, when the slag layer is thicker in the steelmaking process of the electric arc furnace 1, and when it is difficult to blow away the slag layer using the conventional oxygen jet or the effect of blowing the slag is insignificant, it is necessary to use a ring hydrogen phase coherent jet to increase the slag blowing intensity of the blowing gas stream. The oxygen jet formation portion of this part of the embodiment is the same as the process in the above embodiment, which may not be repeated here in detail. The steam generator 231 generates high-temperature and high-pressure water vapor, opens a valve of the inlet pipe of the second steam containment chamber 72, and the high-temperature and high-pressure water vapor enters the second steam containment chamber 72 at the same time, squeezes and drives the second piston 71 to move and compress the hydrogen gas in the hydrogen containment chamber 73. When the pressure gauge inside the hydrogen containment chamber 73 detects that the hydrogen pressure has reached the set value, a valve of the inlet pipe of the second steam containment chamber 72 closes and the movement of the second piston 71 stops. At this time, the valve of the hydrogen gas containment chamber 73 outlet pipe is opened, and the high-pressure hydrogen gas enters the annular hydrogen jet pipe 54 within the non-contact temperature measurement device 5 (see FIG. 6 for details regarding the structure of the non-contact temperature measurement device 5) and is output as an annular gas under the restriction of the annular inner cavity of the annular hydrogen jet pipe 54. The cyclic hydrogen gas reacts with the epoxy gas output from the epoxy jet pipe 52 in a combustion reaction at high temperatures to form a more powerful energy constraint region at the periphery of the core section of the high-pressure oxygen jet to improve the core section length and penetration. This process is used to improve the accuracy of temperature measurement in the case of a large thickness of the slag layer in the middle stage of smelting in the electric arc furnace 1.

After the hydrogen in the hydrogen containment chamber 73 is discharged, the valve of the outlet pipe of the hydrogen containment chamber 73 is closed, the valve of the inlet pipe of the hydrogen containment chamber 73 is opened, and the electrolytic water device 314 electrolyzes the hydrogen to generate hydrogen to be supplied to the hydrogen containment chamber 73, and the hydrogen pushes the second piston 71 back to the original position to prepare for the next round of hydrogen compression.

In some embodiments, high-temperature and high-pressure water vapor is generated in the steam generator 231, and by opening the valve of the main gas supply line of the steam generator 231, the high-temperature and high-pressure water vapor enters into the first steam containment chamber 42 and the second steam containment chamber 72, and squeezes and pushes the first piston 41 and the second piston 71 to move and compress the interior gas, respectively. At this time, the valves of the electrolytic cell exhaust gas pipeline 61, the valves of the oxygen delivery pipeline 62, and the valves of the hydrogen delivery pipeline are closed. When the gas pressure reaches the set requirement as observed by the pressure gauges of the oxygen containment chamber 43 and the hydrogen containment chamber 73, the first piston 41 and the second piston 71 are also moved to a position between the port of the electrolytic cell exhaust gas pipeline 61 and the port of the oxygen delivery pipeline 62 and a position between the port of the electrolytic cell exhaust gas pipeline 61 and the hydrogen delivery pipeline port.

After the high-pressure gas in the oxygen containment chamber 43 and the hydrogen containment chamber 73 is discharged to a rated amount, a valve of the electrolytic cell exhaust gas pipeline 61, a valve of the oxygen delivery pipeline 62, and a valve of the hydrogen delivery pipe are opened, and a valve of the outlet pipe of the oxygen containment chamber 43 and a valve of the outlet pipe of the hydrogen containment chamber 73 are closed. The oxygen is supplemented to the oxygen containment chamber 43 through the oxygen delivery pipeline 62 and does work on the first piston 41 to push the first piston 41 to move in the direction of the first steam containment chamber 42, and the hydrogen is supplemented to the hydrogen containment chamber 73 through the hydrogen delivery pipe and does work on the second piston 71 to push the second piston 71 to move in the direction of the second steam containment chamber 72. The first piston 41 and the second piston 71 move as the spent steam from the electrolytic cell spent vapor pipeline 62 enters the electrolytic cell 32, until the first piston 41 and the second piston 71 are pushed to their original positions, at which time a valve of the electrolytic cell spent vapor pipeline 61, a valve of the oxygen delivery pipeline 62, and a valve of the hydrogen delivery pipeline are closed to prepare for the next round of oxygen compression.

Figure 6:
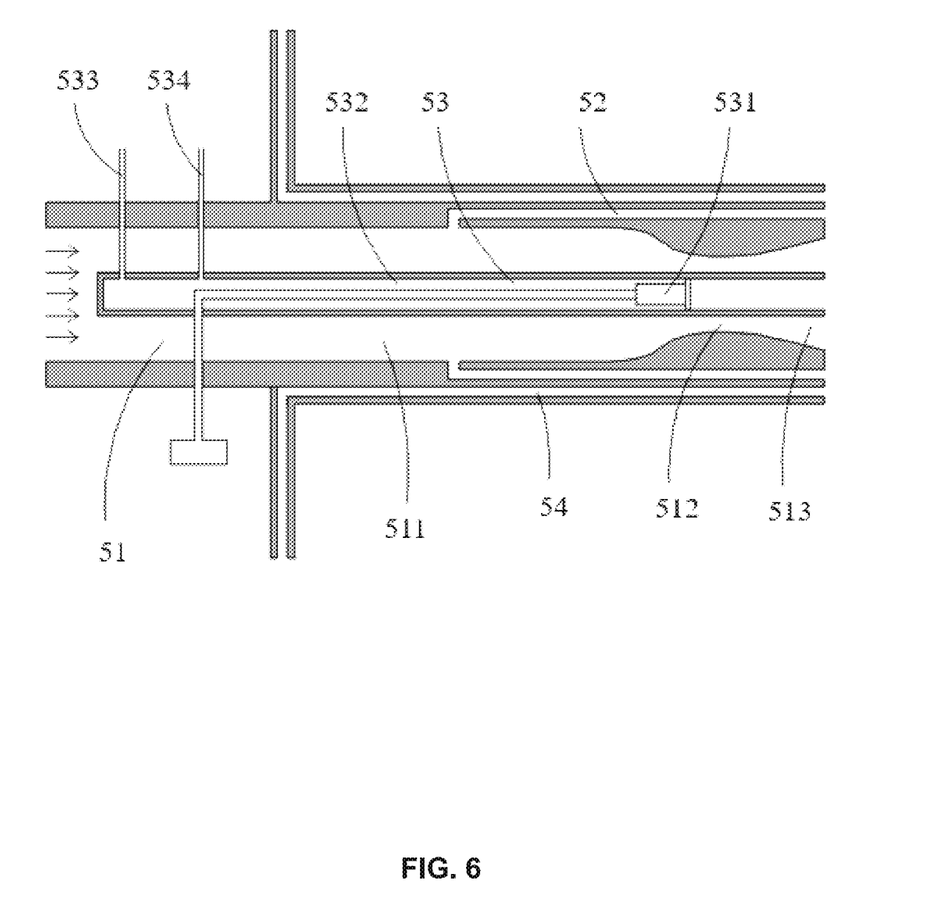
FIG. 6 is a schematic diagram illustrating a structure of a non-contact temperature measurement device according to some embodiments of the present disclosure.

FIG. 6 is a schematic diagram illustrating a structure of a non-contact temperature measurement device according to some embodiments of the present disclosure.

In some embodiments, the non-contact temperature measurement device 5 includes a main oxygen jet pipe 51, an epoxy jet pipe 52, and a temperature measurement inner pipe 53, as illustrated in FIG. 6. An input end of the main oxygen jet pipe 51 communicates with the oxygen containment chamber 43. The epoxy jet pipe 52 is annularly disposed at the periphery of the main oxygen jet pipe 51 and one end of the epoxy jet pipe 52 communicates with the main oxygen jet pipe 51. The temperature measurement inner pipe 53 is used to measure the temperature of the molten steel. After the main oxygen jet pipe 51 receives the oxygen from the oxygen containment chamber 43, the majority of the oxygen forms a high-pressure oxygen jet that is ejected from the output port end, and a small portion of the oxygen enters through the input end of the epoxy jet pipe 52 and is output as a ring gas under the restriction of the annular inner cavity of the epoxy jet pipe 52, which restricts a core section at the periphery of the core section of the oxygen jet, slows down the attenuation of the oxygen jet, and serves to maintain the length of the core section of the jet and its penetration.

The main oxygen jet pipe 51 is a nozzle structure comprising a pipe inlet 511, a pipe indention 512, and a pipe outlet 513. The main oxygen jet pipe 51 forms a Laval nozzle by gradually contracting and then gradually expanding the structure, accelerating the flow rate of the oxygen gas stream, so that the oxygen jet is able to reach a supersonic state of being ejected. After the floating slag is blown away by the oxygen jet, the temperature probe 531 in the temperature measurement inner pipe 53 can rely on its infrared temperature measurement device to capture the high-temperature radiation signal of the molten steel. More descriptions of the infrared temperature measurement device may be found in FIG. 1 and related descriptions. Because of the blowing and clearing effect of the supersonic oxygen jet, there is no interference from any external factors such as smoke, soot, and slag layer on the path of the signal capture, and the temperature signal of the molten steel captured by the temperature measurement probe 531 is real and reliable.

In some embodiments, the non-contact temperature measurement device 5 further includes an annular hydrogen jet duct 54. The annular hydrogen jet duct 54 is annularly disposed at the periphery of the main oxygen jet duct 51. One end of the annular hydrogen injection duct 54 communicates with the hydrogen containment chamber 73. The other end of the annular hydrogen jet pipe 54 is in communication with the interior of the electric arc furnace 1.

In some embodiments, the arrangement of the blowing airflow in the non-contact temperature measurement device 5 is selected in accordance with the demand of the blowing airflow at the smelting site by selecting an inner-to-outer main-oxygen-epoxy-hydrogen and main oxygen-epoxy-hydrogen-epoxy multi-layer design, while the main oxygen jet pipe 51 is also set up in a plurality of ways without affecting the purpose of the structure to improve the length and penetration of the core section of the blowing airflow.

The temperature measurement inner pipe 53 includes a temperature measurement probe 531, a cooling chamber 532 of a probe inner tube, a cooling water inlet pipe 533, and a cooling water outlet pipe 534. The cooling water inlet pipe 533 and the cooling water outlet pipe 534 communicate with the probe inner pipe cooling cavity 532, respectively. The temperature signal of the molten steel captured by the temperature measurement probe 531 can be transformed into a digital signal representing the online real-time temperature of the molten steel through the temperature measurement signal transmission channel as well as the temperature measurement signal processing and the output device, so that the smelting operation on-site can be clearly defined by the workers according to the signal. According to the signal, the workers can clearly define the online real-time temperature of the molten steel in the steelmaking process of the electric arc furnace 1, which is convenient for optimizing and improving the smelting process, such as supplying oxygen and power, blowing of auxiliary materials, slag flow through the door, and end-point control.

Considering that the non-contact temperature measurement device 5 is exposed to the high temperature environment inside the electric arc furnace 1 for a long period of time, and is prone to problems such as overheating damage brought about by too high temperatures, and a large error in the temperature measurement of the molten steel, a probe inner pipe cooling chamber 532 is designed, which is supplied with flowing cooling water by the cooling water inlet pipe 533. The cooling water cools down and protects the temperature measurement element of the temperature measurement probe 531, and after the temperature of the cooling water rises, the cooling water is discharged through the cooling water outlet pipe 534.

In some embodiments, when the steelmaking process of the electric arc furnace 1 requires continuous on-line temperature measurement, the required cooling water flow rate is large, and therefore the cooling water inlet pipe 533 communicates with the water supply tank 21 to ensure sufficient water supply. At the same time, the cooling water outlet pipe 534 communicates with the electrolytic cell 32 to supply the cooled water with elevated temperature directly to the electrolytic water device 314 to improve the efficiency of the water electrolysis (the higher the temperature of the electrolyzed water, the higher the efficiency).

The beneficial effect of the present disclosure is that: 1. The thermal energy recovery component recovers waste heat from high-temperature flue gases generated in the steelmaking process of an electric arc furnace for steam production; the Seebeck-effect thermoelectric power generation component recovers waste heat from high-temperature flue gases generated in the steelmaking process of the electric arc furnace and generates electricity, which is used to electrolyze water in the electrolytic cell to produce oxygen. The use of steam in the piston type oxygen compression device to do work to make oxygen compression, high-pressure oxygen release to form a jet through the non-contact temperature measurement device to the molten steel jet will blow away the slag, to ensure that the temperature measurement device can continuously and accurately measure the temperature of the molten steel along the direction of the oxygen jet; 2. In the process where the non-contact temperature measurement device does not carry out the temperature measurement (such as during the pre-smelting of the furnace charge melting and melting pool reaction process before the electric arc furnace smelting, temperature measurement of the melting pool is not required), because it provides a supersonic oxygen jet, it is still used as a conventional supersonic oxygen jet. At this time, the main role of the non-contact temperature measurement device is to supply oxygen to the molten pool to accelerate the melting of the charge, the exothermic chemical reaction of the molten pool, and the smelting process; 3. The recycling and utilization of the high-temperature flue gas of the steelmaking process of the electric arc furnace residual heat, compression work and waste heat generation, production and compression of oxygen, formation of blowing airflow, complete the online real-time detection of the temperature of the molten steel in the steelmaking process of the electric arc furnace. The whole process has almost no additional energy consumption, relying only on the flue gas waste heat can achieve various functions; 4. When the slag layer is thicker during the steelmaking process in the electric arc furnace, the use of conventional oxygen jets is difficult to blow open the slag layer or the slag blowing effect is not obvious, the ring hydrogen phase is used to improve the blowing strength of the blowing airflow for slag removal. Specifically, the hydrogen produced is compressed by the piston hydrogen compression device to do work on the hydrogen, and after release, it enters the non-contact temperature measurement device in the form of a ring to form a ring gas, weakening the attenuation speed of the core section of the oxygen jet and strengthening the length of the core section of the oxygen jet.

The basic concepts have been described above, and it is apparent to those skilled in the art that the foregoing detailed disclosure serves only as an example and does not constitute a limitation of the present disclosure. While not expressly stated herein, various modifications, improvements, and amendments are made to this specification by those skilled in the art. Those types of modifications, improvements, and amendments are suggested in the present disclosure, so these types of modifications, improvements, and amendments remain within the spirit and scope of the exemplary embodiments of the present disclosure.

Also, the specification uses specific words to describe embodiments of the present disclosure. Such as "an embodiment", "one embodiment", and/or "some embodiments" means a feature, structure, or characteristic associated with at least one embodiment of the present disclosure. Accordingly, it should be emphasized and noted that "one embodiment" or "one embodiment" referred to two or more times in different locations in this specification or "a number of embodiments" means a feature, structure, or characteristic related to at least one embodiment of the present disclosure. "An embodiment" or "an alternative embodiment" in different locations in the present disclosure do not necessarily refer to the same embodiment. In addition, certain features, structures, or characteristics of one or more embodiments of the present disclosure are suitably combined.

Furthermore, unless expressly stated in the claims, the order of the processing elements and sequences, the use of numerical letters, or the use of other names as described in this specification are not intended to qualify the order of the processes and methods of the present disclosure. While some embodiments of the invention that are currently considered useful are discussed in the foregoing disclosure by way of various examples, it should be appreciated that such details serve only illustrative purposes, and that additional claims are not limited to the disclosed embodiments; rather, the claims are intended to cover all amendments and equivalent combinations that are consistent with the substance and scope of the embodiments of the present disclosure. For example, while the above-described system components are implemented via hardware devices, they are also realized only via software solutions, such as installing the described system on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or a description thereof. However, the method of disclosure does not imply that more features are required for the objects of the present disclosure than are mentioned in the claims. Rather, claimed subject matter is lie in less than all features of a single foregoing disclosed embodiment.

For each patent, patent application, patent application disclosure, and other material cited in the present disclosure, such as articles, books, manuals, publications, documents, etc., the entire contents of which are hereby incorporated herein by reference. Application history documents that are inconsistent with or conflict with the contents of the present disclosure are excluded, as are documents (currently or hereafter appended to this specification) that limit the broadest scope of the claims of the present disclosure. It should be noted that in the event of any inconsistency or conflict between the descriptions, definitions, and/or use of terms in the materials appended to this specification and those set forth herein, the descriptions, definitions and/or use of terms in the present disclosure shall prevail.

Finally, it should be understood that the embodiments described in the present disclosure are only used to illustrate the principles of the embodiments of the present disclosure. Other variations are also fall within the scope of the present disclosure. As such, alternative configurations of embodiments of the present disclosure are viewed as consistent with the teachings of the present disclosure as an example, not as a limitation. Correspondingly, the embodiments of the present disclosure are not limited to the embodiments expressly presented and described herein.

What is claimed is:

1. A thermal energy recovery auxiliary system for temperature detection of molten steel in a steelmaking process, comprising:
   an electric arc furnace, wherein a flue communicates with a side wall of the electric arc furnace;
   a water supply device including a water supply tank, a water supply pipeline of an electrolytic cell, and a thermal energy recovery component, wherein the water supply tank supplies water to the thermal energy recovery component via a water supply pipeline of a steam generator of the thermal energy recovery component, the water supply tank supplies water to the electrolytic cell via the water supply pipeline of the electrolytic cell, and the thermal energy recovery component exchanges heat with the flue to generate steam;
   a power generation system including a Seebeck-effect thermoelectric power generation component and the electrolytic cell, wherein the Seebeck-effect thermoelectric power generation component includes a thermoelectric generator, a voltage stabilizer, a rechargeable battery, and an electrolytic water device, the thermoelectric generator, the voltage stabilizer, and the rechargeable battery form a closed loop, and the rechargeable battery and the electrolytic water device form a closed loop, the electrolytic water device is arranged in the electrolytic cell, and the electrolytic cell communicates with the water supply pipeline of the electrolytic cell, a high-temperature side of the thermoelectric generator exchanges heat with the flue and generates a electromotive force in the electrolytic cell;
   a piston oxygen compression device, which forms a steam containment chamber and an oxygen containment chamber through a piston isolation, wherein the steam containment chamber communicates with the thermal energy recovery component and the oxygen containment chamber communicates with the electrolytic cell;
   one or more non-contact temperature measurement devices, one end of each of the one or more non-contact temperature measurement devices communicates with the oxygen containment chamber and the other end of each of the one or more non-contact temperature measurement devices communicates with an interior of the electric arc furnace.

2. The system according to claim 1, wherein
   the thermal energy recovery component further includes a helical heating coil, the water from the water supply tank enters the steam generator via the water supply pipeline of the steam generator, high-temperature and high-pressure water vapor generated in the steam generator enters into an interior of the steam containment chamber via a gas supply main line of the steam generator, and the helical heating coil is wound around a periphery of the flue and the helical heating coil communicates with the steam generator.

3. The system according to claim 1, wherein the thermoelectric generator includes a high-temperature side thermal conductive ceramic, a low-temperature side thermal conductive ceramic, an n-type semiconductor, a p-type semiconductor, a high-temperature side metal plate, two low-temperature side metal plates, and an insulation layer, one low-temperature side metal plate is bonded to a side of the n-type semiconductor, the other one low-temperature side metal plate is bonded to a side of the p-type semiconductor, the two low-temperature side metal plates are located on a same side of the n-type semiconductor and the p-type semiconductor, the n-type semiconductor and the p-type semiconductor, as well as the two low-temperature side metal plates, are isolated by the insulation layer, the high-temperature side metal plate is bonded to the other side of the n-type semiconductor and the p-type semiconductor, and the high-temperature side thermal conductive ceramic is bonded to the high-temperature side metal plate, the low-temperature side thermal conductive ceramic is bonded to the two low-temperature side metal plates.

4. The system according to claim 3, wherein a heat exchange surface of the high-temperature side thermal conductive ceramic is provided with heat transfer fins.

5. The system according to claim 1, wherein the Seebeck-effect thermoelectric power generation component further includes an external supplementary power source, the external supplementary power source is electrically connected with the electrolytic water device.

6. The system according to claim 1, wherein the system further includes an electrolytic cell exhaust gas pipeline and an oxygen delivery pipeline that communicate with the electrolytic cell and the piston oxygen compression device at both ends, a communication port of the electrolytic cell exhaust gas pipeline and the piston oxygen compression device is located in a middle of a path of the piston, and a communication port of the oxygen delivery pipeline and the piston oxygen compression device is located outside the path of the piston.

7. The system according to claim 6, wherein the oxygen delivery pipeline includes a gas storage tank and a multi-point balance heat exchanger sequentially communicated along a direction of oxygen delivery, and a path of the electrolytic cell exhaust gas pipeline traverses the multi-point balance heat exchanger.

8. The system according to claim 6, wherein the system further includes an oxygen production device, and the oxygen production device communicates with the oxygen delivery pipeline.

9. The system according to claim 6, wherein the system further includes an oxygen production device and an oxygen compression device sequentially communicated along a direction of oxygen delivery, wherein the oxygen compression device communicates with an input end of the non-contact temperature measurement device.

* * * * *